United States Patent [19]

McBride

[11] 3,824,498

[45] July 16, 1974

[54] DIGITAL PROCESSOR FOR SELECTIVELY SYNTHESIZING SINUSOIDAL WAVEFORMS AND FREQUENCY MODULATIONS

[75] Inventor: Alan L. McBride, Richardson, Tex.

[73] Assignee: Dallas Instruments Incorporated, Dallas, Tex.

[22] Filed: Dec. 22, 1972

[21] Appl. No.: 317,848

[52] U.S. Cl. ............ 332/9 R, 178/66 R, 325/38 R, 325/163, 332/1 D

[51] Int. Cl. ............ H03k 7/06

[58] Field of Search ........ 332/9 R, 9 T, 11 R, 11 D; 325/38 R, 163; 178/66 R

[56] References Cited

UNITED STATES PATENTS

| | | | |
|---|---|---|---|
| 3,095,539 | 6/1963 | Bennett et al. | 325/163 |
| 3,617,889 | 11/1971 | Rabinowitz | 178/66 R |
| 3,617,941 | 11/1971 | De Lellis | 332/9 R |
| 3,621,403 | 11/1971 | Sely | 332/9 R |
| 3,636,477 | 1/1972 | Selz | 332/9 R |
| 3,706,945 | 12/1972 | Yanagidaira et al. | 325/163 X |
| 3,749,843 | 7/1973 | Roycraft et al. | 332/9 R |

*Primary Examiner*—Alfred L. Brody
*Attorney, Agent, or Firm*—Harold Levine; Rene' E. Grossman; Alva H. Bandy

[57] ABSTRACT

A digital oscillator produces discrete quantized samples of a sinusoidal waveform at a fixed sample time. A predetermined frequency is established. A read only memory has predetermined values of the amplitude of a sinusoidal waveform. A read only memory is addressed with the predetermined frequency number to provide a sample value of said sinusoidal waveform.

5 Claims, 12 Drawing Figures

DIGITAL PROCESSOR FOR SELECTIVELY SYNTHESIZING SINUSOIDAL WAVEFORMS AND FREQUENCY MODULATIONS

This invention is directed to a digital oscillator and more particularly to a digital oscillator suitable for communication equipment.

The advent of Large Scale Integration (LSI) techniques have made many of the communication functions previously performed by analog techniques amenable to digital implementation.

A digital oscillator is a device which produces discrete quantized ($n$-bits) samples of a sinusoidal waveform at some fixed sample rate. There are basically two methods for generating samples in an all digital oscillator — recursively and nonrecursively. Recursive digital oscillators result from an examination of the different equations relating sinusoidal outputs to previously computed outputs. These different equations are obtained by applying Z-transformation techniques to the Laplace transform of an oscillator output (either sine or cosine). Problems are encountered when a digital oscillator is implemented recursively; the round-off errors associated with each iteration tend to build up and become unbounded, therefore requiring some type error compensation.

The nonrecursive digital oscillator which is the subject of this invention does not have this inherent error build-up. This approach requires that $n$-bit samples for one cycle of the sinusoid be stored in a memory, generally a read-only memory (ROM). Since it is physically impossible to store every sample value for one cycle of a sinusoid in a finite size ROM, M equally spaced sample values of the waveform are stored. This M-word quantization and the $n$-bit discretization of the sampled waveform (sample values stored in an Mxn ROM) are the two sources of amplitude error for the nonrecursive digital oscillator. These errors however do not build up and are constant for each M and n combination.

The choice of which approach to employ in implementing a digital oscillator is usually dictated by the particular application of the oscillator. For example, a nonrecursive digital oscillator which uses a ROM in conjunction with shift registers and simple control circuitry can be used to obtain output waveforms in the neighborhood of 10 MHz using standard techniques. These relatively high sample rates cannot be achieved using the recursive digital oscillator approach implemented with similar logic. However, the recursive digital oscillator under some conditions requires less logic and might be preferred if high sample rates are not required.

It is therefore an object of this invention to provide a new and improved Digital Oscillator. Another object of this invention is to provide a new and improved digital oscillator suitable for communication equipment.

Figure 10A:
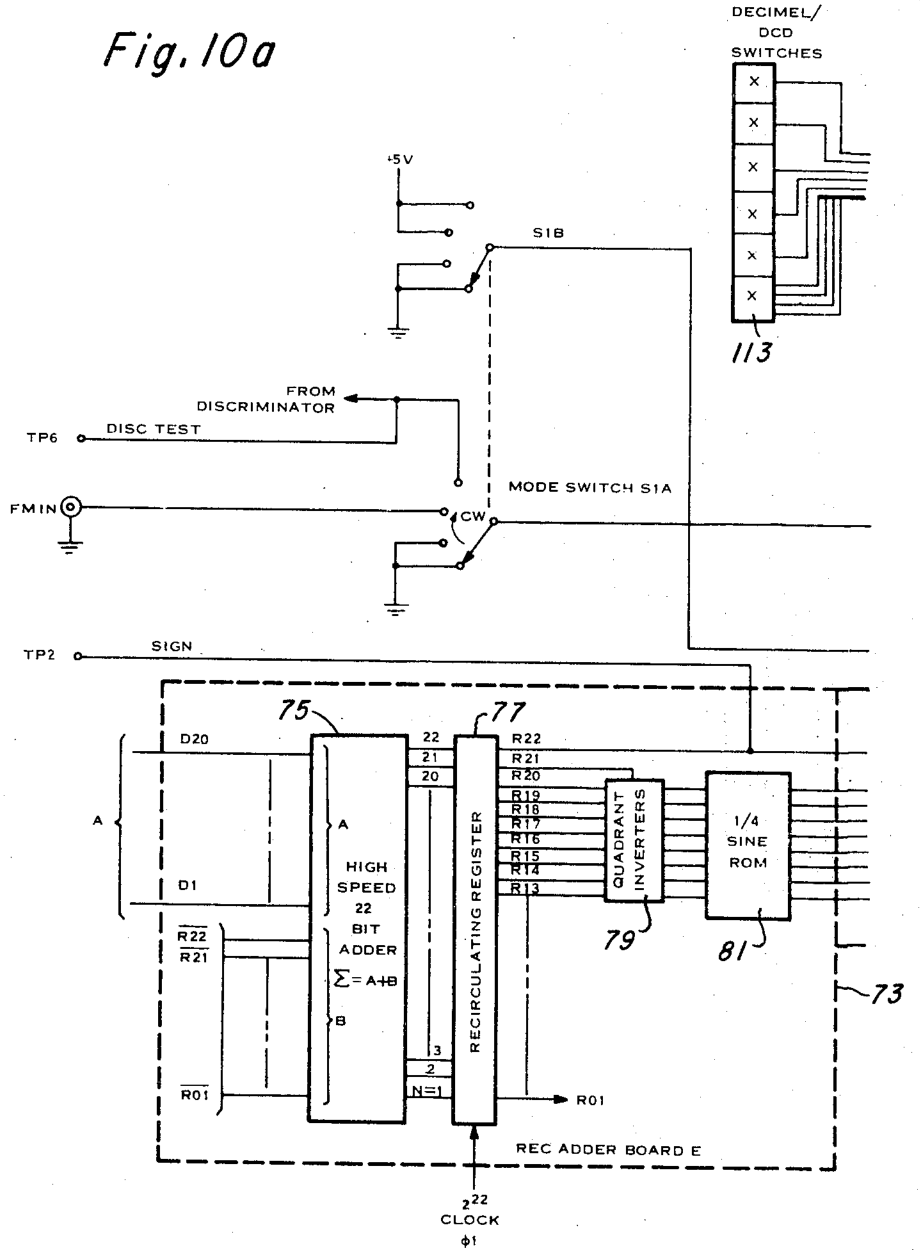
Figure 10B:
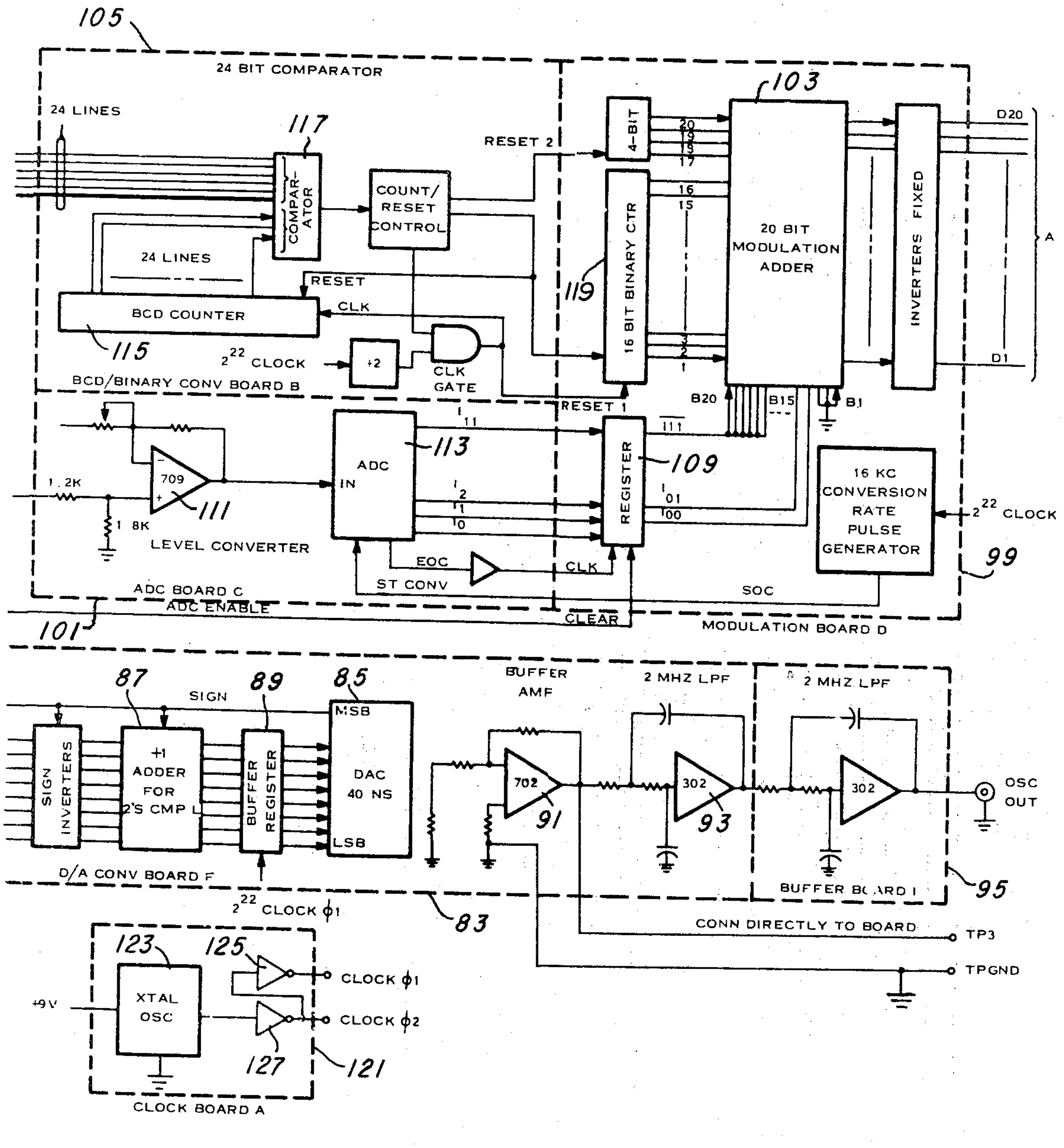

FIGS. 10*a* and 10*b* show the seven digital blocks of the Digital Oscillator.

Figure 11:
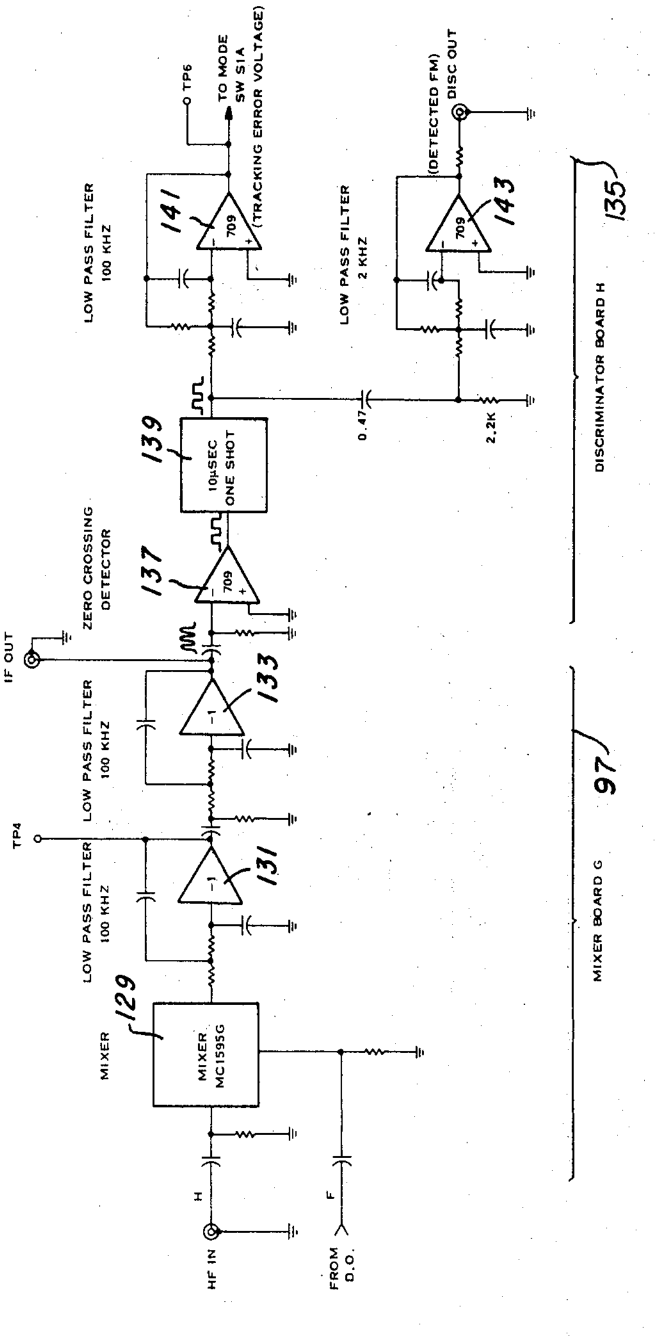

FIG. 11 shows the Analog Layout.

Figure 1:
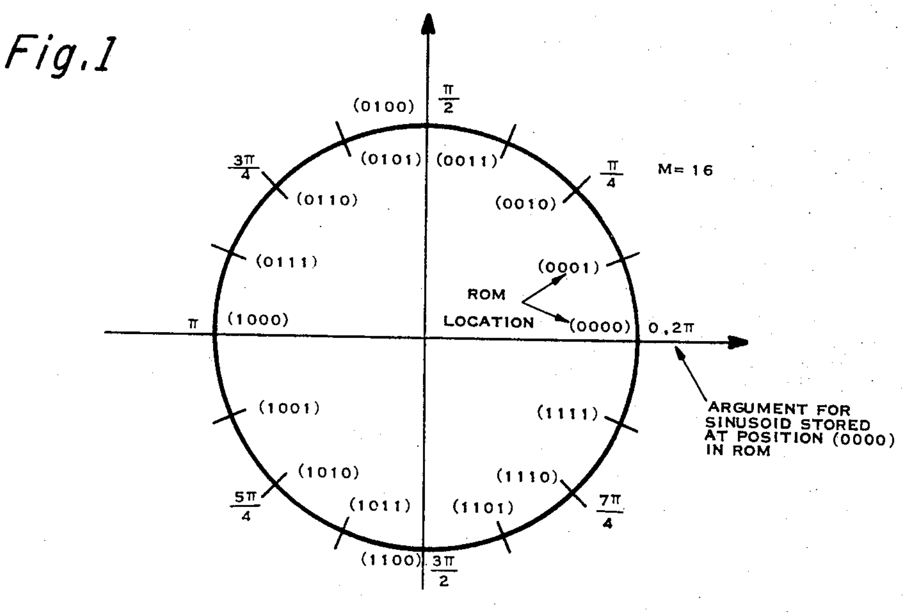
FIG. 1 shows the Phase Circle.

The nonrecursive digital oscillator described herein generates sampled approximations to a continuous sinusoid by selectively reading points from a read-only-memory (ROM). (A resistor bridge network can also be used to obtain these discrete read-out values.) The approximations are generated as follows:

Let $y(t)$ represent a continuous sinusoid of frequency $f_o$, e.g., $y(t) = \cos 2\pi f_o t$ (18)

when expressed discretely, $y(t)$ becomes $$y(n\Delta T) = \cos 2\pi n\, f_o\, \Delta T \quad n = 0, 1, \ldots \tag{19}$$

$$= \cos 2\pi n\, f_o/f_s$$

where $f_s$, the sample frequency, is at least twice $f_o$. The ratio $f_o/f_s$ defines some incremental step or arc around the phase circle, where the phase circle is depicted in FIG. 1. The quantity $nf_o/f_s$ represents a complete history of the steps taken around the phase circle. Assume now that the phase circle is discretized into M equally spaced intervals (where M is 16 in FIG. 1), with a sinusoidal value stored in an ROM for each interval. For example, the value cos(o) would be stored in position (0000) of the ROM; similarly $\cos(2\pi/M) = \cos(\pi/8)$ in position (0001). There are therefore M distinct sinusoidal values stored in the ROM. The storage requirement is somewhat simplified since only one quadrant of the sinusoid is unique, therefore requiring only M/4 distinct values in the ROM.

An exact representation for $y(n\Delta T)$ is obtained only when an infinite number of sample values are stored in a ROM. This is obviously an impossibility. Therefore, once an M is selected, all arguments for $y(n\Delta T)$ (i.e., $2\pi nf_o/f_s$) lying in an interval are approximated by the argument for that interval, where now the arguments $2\pi nf_o/f_s$ are constrained to be always in the interval 0 to $2\pi$. (This is accomplished simply by performing modulo 1 addition for the quantity $nf_o/f_s$.) The ROM position containing the stored sinusoidal value for a particular interval is obtained by truncating the product $Mnf_o/f_s$. Since $nf_o/f_s$ is modulo 1, the quantity $Mnf_o/f_s$ is modulo M. The truncation ensures only integer values of the product since there are only integer positions in the ROM.

The sinusoidal value extracted from the ROM for a particular $n$ is therefore given by:

$$y(n\Delta T) = \cos 2\pi/\mathrm{M}\ [\mathrm{M}nf_o/f_s] \tag{20}$$

where $y$ denotes the estimate of $y$ and the brackets indicate truncation and modulo M addition. The quantity $2\pi/\mathrm{M}$ defines the basic phase increments around the phase circle. The product $2\pi/\mathrm{M}\ [\mathrm{M}nf_o/f_s]$ therefore represents the argument for the sinusoidal value stored at the $[\mathrm{M}nf_o/f_s]$ position in the ROM.

FOURIER ANALYSIS

A continuous sinusoid of frequency $f_o$ has a frequency spectrum composed of two impulses, one at $-f_o$ and one at $+f_o$. The spectrum at a digital oscillator should be the same. Fourier analysis is a tool for comparing the frequency response of the nonrecursive digital oscillator estimate $y(n\Delta T)$ to the ideal spectrum.

The output of the digital oscillator is assumed to be representable as a series of impulse functions of period T, each impulse having as its magnitude the value of the oscillator at that sample time; i.e., $$y(t)=\sum_{j=0}^{K-1}\cos\frac{2\pi}{M}\,[Mjf_o/f_s]\,\delta(t-j\Delta T) \quad (21)$$

where $\delta$ is the Kronecker Delta, $\Delta T$ is the sample interval, and K is some integer such that $Kf_o/f_s$ is an integer. The selection of K ensures that the output $y(t)$ is periodic in T.

Using the usual definitions of the Fourier coefficients $a_n$, $b_n$, and $a_o$, $$a_n=\frac{1}{T}\int_0^T y(t)\cos\frac{2\pi nt}{T}\,dt$$

$$b_n=\frac{1}{T}\int_0^T y(t)\sin\frac{2\pi nt}{T}\,dt$$

$$a_o=\frac{1}{T}\int_0^T y(t)\,dt \quad (22)$$

and inserting $y(t)$ from equation (21), $a_n$, $b_n$, and $a_o$ become:

$$a_n=\frac{1}{T}\int_0^T\sum_{j=0}^{K-1}\cos\frac{2\pi}{M}\,[Mjf_o/f_s]\,\delta(t-j\Delta T)\cos\frac{2\pi nt}{T}\,dt$$

$$=\frac{1}{T}\sum_{j=0}^{K-1}\cos\frac{2\pi}{M}\,[Mjf_o/s^f]\cos\frac{2\pi nj\Delta T}{T}$$

$$b_n=\frac{1}{T}\int_0^T\sum_{j=0}^{K-1}\cos\frac{2\pi}{M}\,[Mjf_o/f_s]\,\delta(t-j\Delta T)\sin\frac{2\pi nt}{T}\,dt$$

$$=\frac{1}{T}\sum_{j=0}^{K-1}\cos\frac{2\pi}{M}\,[Mjf_o s^f]\sin\frac{2\pi nj\Delta T}{T}$$

$$a_o=\frac{1}{T}\int_0^T\sum_{j=0}^{K-1}\cos\frac{2\pi}{M}\,[Mjf_o/s^f]\,\delta(t-j\Delta T)\,dt$$

$$=\frac{1}{T}\sum_{j=0}^{K-1}\cos\frac{2\pi}{M}\,[Mjf_o/s^f] \quad (23)$$

The spectral components are obtained as $$S_n=(a_n^2+b_n^2)^{1/2}$$

Figure 2:
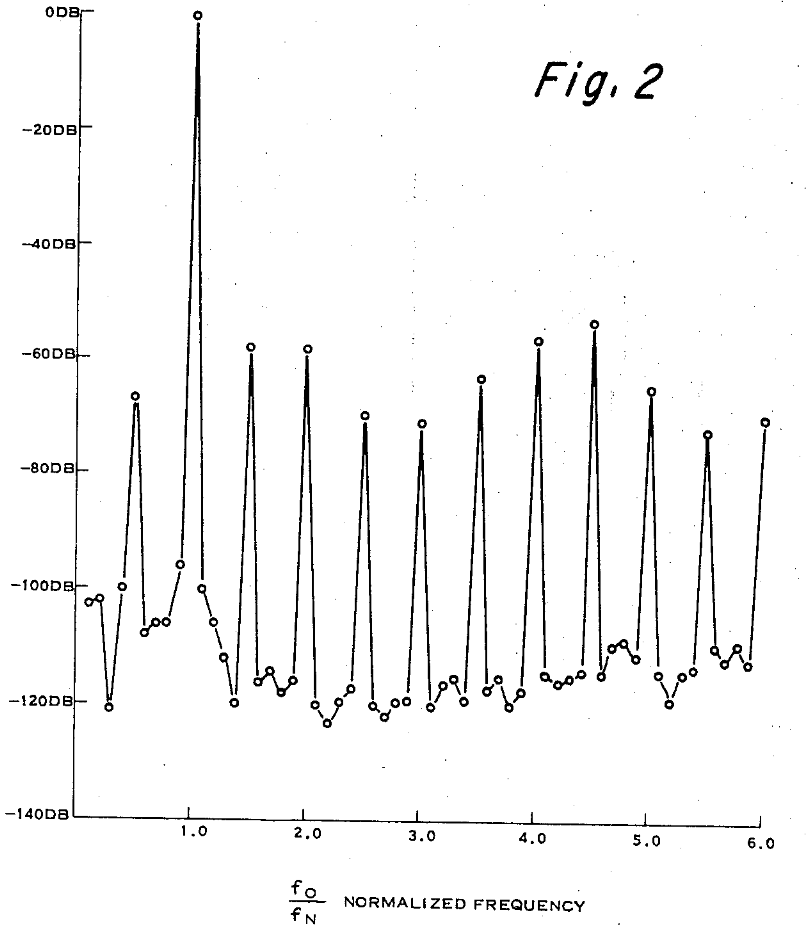
FIG. 2 shows the Spectral Analysis for $f_o/f_s$ Ratio of 1/11.2.
Figure 3:
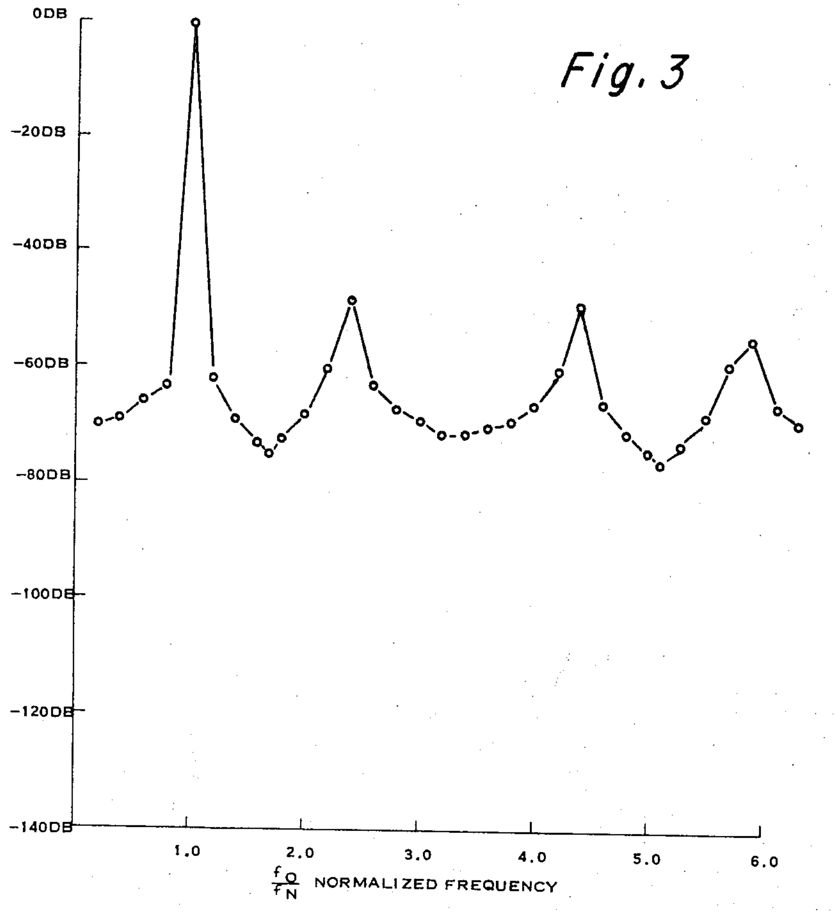
FIG. 3 shows the Spectral Analysis for $f_o/f_s$ Ratio of 1/17.3.
Figure 4:
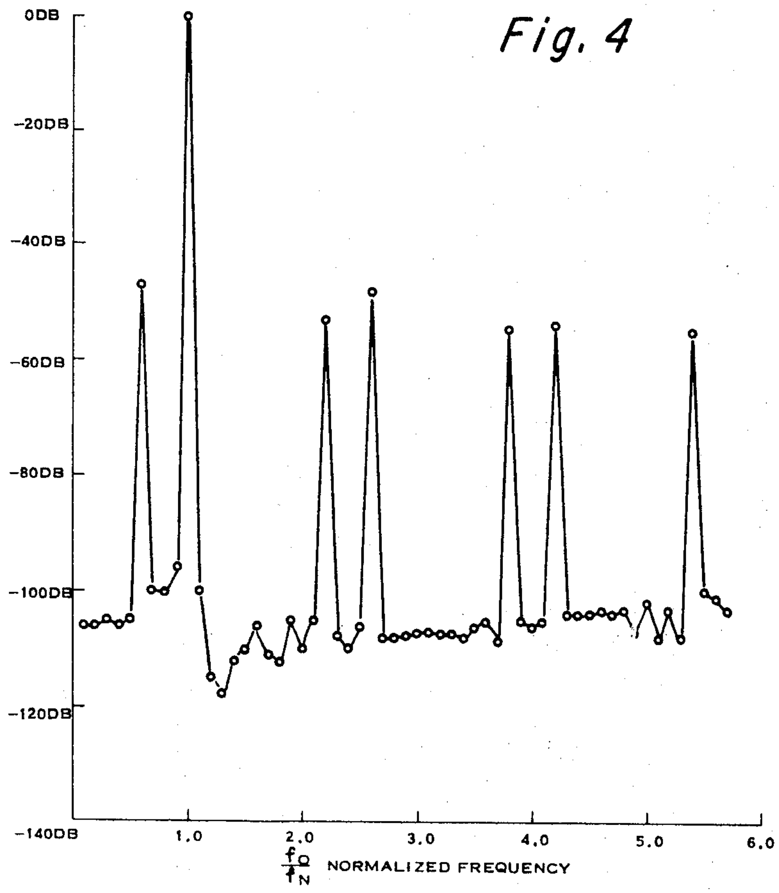
FIG. 4 shows the Spectral Analysis for $f_o/f_s$ Ratio of 1/22.5.

This analysis has been performed for various $f_o/f_s$ ratios with a fixed M of 256. Spectral plots for the ratios 1/11.2, 1/17.3, and 1/22.5 are shown in FIGS. 2, 3, and 4, respectively. The horizontal scale is normalized frequency; the vertical is normalized to 0 dB. The sidelobes for the three cases are down at least 47 dB from the fundamental.

ERROR ANALYSIS

The truncation in the model for $y(n\Delta T)$ obviously causes errors in the approximation to $y(n\Delta T)$. An upper bound may be placed on this error as follows: Let $\epsilon$ represent the error introduced by the truncation; i.e., $$2\pi nf_o/f_s-2\pi/M\,[Mnf_o/f_s]=\epsilon \quad (24)$$

or $$2\pi nf_o/f_s=2\pi/M\,[Mnf_o/f_s]+\epsilon$$

Taking the sine of both sides $$\sin 2\pi nf_o/f_s=\sin\,(2\pi/M)\,[Mnf_o/f_s]+\epsilon \quad (25)$$

$$=\sin 2\pi/M\,[Mnf_o/f_s]\cos\epsilon+\cos 2\pi/M\,[Mnf_o/f_s]\sin\epsilon$$

Using the phase circle of FIG. 1, the maximum error of $\epsilon_{max}$ for a particular M is $$\epsilon_{max}=2\pi/M \quad (26)$$

since the truncation can never result in an error of more than one interval. For large values of M, (M 2464), cos $(2\pi/M)$ becomes very close to one. Using this approximation, $$\sin 2\pi nf_o/f_s-\sin 2\pi/M\,[Mnf_o/f_s]=\cos 2\pi/M\,[Mnf_o/f_s]\,\sin\epsilon_{max} \quad (27)$$

The upper bound on the output error is obtained by realizing that $\cos 2\pi/M[Mnf_o/f_s]$ has a maximum value of one. This results in $$\sin 2\pi nf_o/f_s-\sin 2\pi/M\,[Mnf_o/f_s]\qquad\sin\epsilon_{max}\cong\epsilon_{max} \quad (28)$$

since for small $\epsilon_{max}$, $\sin\epsilon_{max}\cong\epsilon_{max}$.

Therefore, the absolute error in amplitude is bounded by the size of the unit intervals around the phase circle (for large M). For the case of M = 256, the maximum error is $2\pi/M = 2\pi/256 = 0.0245$, or 2.45 percent as a maximum.

Figure 5:
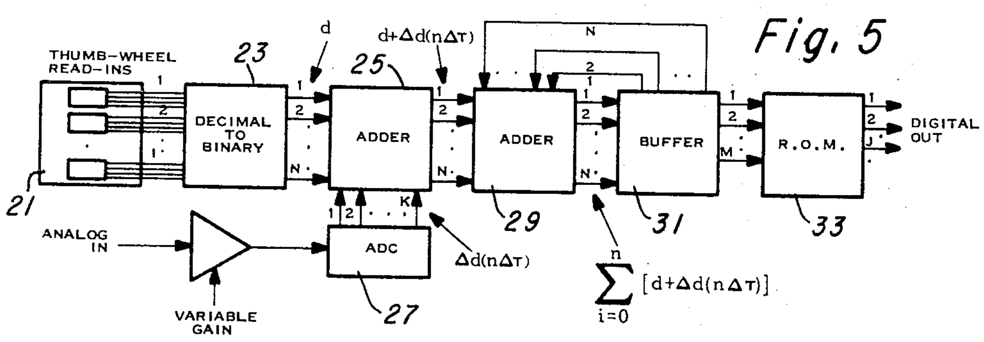
FIG. 5 shows the Nonrecursive Digital Oscillator.

A block diagram of the nonrecursive digital oscillator is shown in FIG. 5. The thumb-wheel 21 read-ins allow one to select the desired output frequency (for frequency synthesizer applications) or the desired quiescent frequency (for VCO applications). The thumb-wheel outputs are binary numbers representing each decimal number selected. These individual outputs enter a decimal-to-binary converter 23 (DBC), the output of the DBC 23, denoted as $d$, being an N-bit binary representation of the desired decimal frequency. This N-bit number then enters as one input to the first N-bit adder 25. The other input, call $\Delta d$, to this adder 25 is a $k$-bit number coming from an analog-to-digital converter 27 (ADC); the input of the ADC 27 being analog modulating signals for FM modulation or error signals for tracking loop configurations.

The $k$-bits from the ADC 27 are added to the N-bits from the DBC 23, the $k$-bits occupying the $k$ least significant bits of the N-bit adder 25. The resulting N-bit output, $d+\Delta d(n\Delta T)$, is an indication of the rate of speed for stepping around the phase circle shown in FIG. 1. In the nonrecursive digital oscillator configuration shown in FIG. 5 the thumb-wheels 21 allow one to determine the interval for selecting points from the phase circle. The ADC output causes perturbations in this interval depending on the input modulating signal.

The second adder 29 performs an integration to maintain a complete history of the inputs $d+\Delta d(n\Delta T)$, and has at its output $$\sum_{i=1}^{n} [d+\Delta d(n\Delta T)]$$

which is held in a storage buffer 31. The adder 29 performs a modulo 1 addition so that at any time its output completely specifies some unique point on the phase circle, i.e., (Sum Mod 1) · ($2\pi$).

The most significant M bits of this sum are used as an address for lookup in the read-only-memory 33 (ROM), where $2^M$ sinusoid values are stored. These values are selected at intervals of $2\pi/2^M$ radians around the phase circle. These M bits serve as the address since the adder 29 performs modulo 1 addition and therefore indicates directly the exact location on the phase circle.

The ROM output is a J-bit binary word representing the sinusoidal value at the position specified by the M-bit address. The order of J may be varied depending on the required significance of the output word, and its selection is independent of other parameters in the system.

Any frequency resolution desired may be obtained by manipulation of the system parameters. The minimum resolution element (MRE), analogous to the elementary bandwidth when taking the discrete Fourier transform, is given by:

$$MRE = 2^{-N} \cdot f_s,$$

where N is the number of bits in the adders. As an example, assume an N of 20 bits and a clock rate of $f_s = 2^N = 1{,}048{,}576$ Hz. The resolution element MRE is then $$MRE = 2^{-20} \cdot 2^{20}$$
$$= 1 \text{ Hz}$$

Therefore, 1 Hz resolution may be obtained by making the above selections. A resolution of 0.25 Hz may be obtained by letting $f_s = 2^{N-2}$; i.e., $$MRE = 2^{-20} \cdot 2^{+18}$$
$$= 0.25 \text{ Hz}$$

These resolutions are however dependent on the stability of the oscillator used in generating $f_s$ and therefore are minimum bounds.

The oscillator design used has the following specifications. The adders are 22-bits, the sample rate $2^{22}$ Hz. This combination allows 1 Hz resolution between 1 Hz and 1 MHz. The read-only-memory 33 contains the equivalent of 256 8-bit words.

The ADC 27 has 12-bits operating at a sample rate of 50 kHz. The design criterion is summarized as follows:

$N = 22$ bits
$f_s = 2^{22}$ Hz
MRE = 1 Hz
M = 8 bits
J = 8 bits
K = 12 bits
$f_{max} = f_s/4 = 1$ MHz There are two basic operating configurations — frequency synthesizers and VCO replacements. Included in frequency synthesizers are synthesizers themselves and frequency translators; in VCO replacements are tracking loops and frequency modulators.

FREQUENCY SYNTHESIZERS

Frequency Synthesizer

Figure 6:
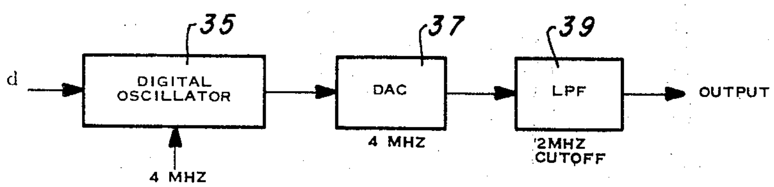
FIG. 6 shows the Frequency Synthesizer.

A configuration demonstrating the use of a digital oscillator as a frequency synthesizer is shown in FIG. 6. A fixed "$d$" representing the frequency to be synthesized is presented to the digital oscillator 35. The outputs of the digital oscillator 35 are binary words representing the digitized sinusoid. These words are then digital-to-analog 37 converted (DAC) and low pass filtered 39 (LPF). The output of the LPF 39 is an analog sinusoid of the desired frequency.

Frequency Translator

Figure 7:
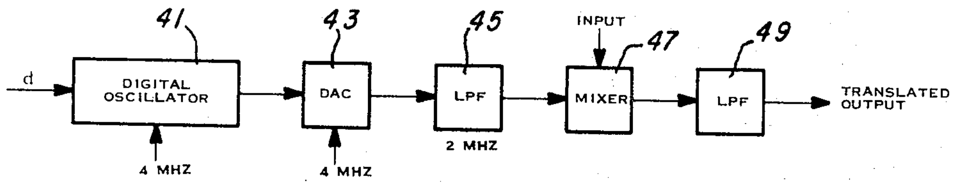
FIG. 7 shows the Frequency Translator.

A frequency translator configuration is shown in FIG. 7. A fixed "$d$" representing some frequency $f_o$ is input to the digital oscillator 41. The digital oscillator output, once passed through the DAC 43 and LPF 45, becomes the required sinusoid of frequency $f_o$. This sinusoid and an input signal of frequency $f_i$ are then mixed in mixer 47 and filtered in low pass filter 49. The output of the LPF 49 is a signal representing the difference frequency $f_d = f_o - f_i$, and is the translated output. The down translation is selected because of its simplicity, but the up translation could also be performed if adequate bandpass filters were constructed.

VOLTAGE CONTROLLED OSCILLATOR REPLACEMENTS

Tracking Filter

Figure 8:
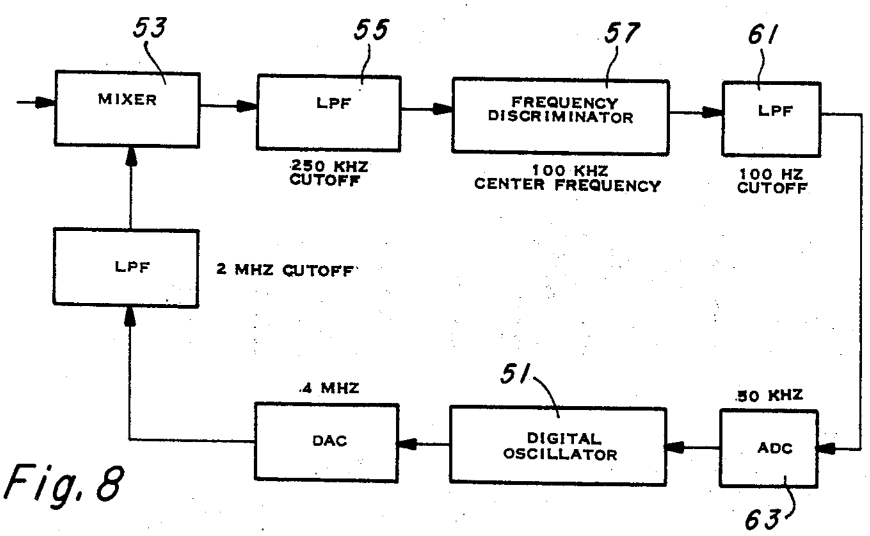
FIG. 8 shows the Tracking Filter.

The next configuration, the tracking filter, is shown in FIG. 8. The loop itself is the conventional tracking filter loop with the voltage controlled oscillator (VCO) replaced by the digital oscillator 51 and appropriate converters. The input signal is assumed to have a carrier $f_c$ and a maximum doppler rate of 100 Hz. This maximum doppler insures that the loop can be constructed in such a way that it will not track audio modulating signals transmitted by the carrier. The quiescent frequency of the digital oscillator is adjusted to be at some frequency $f_Q$. When initialized, the input carrier and the analog equivalent output of the digital oscillator are mixed 53 and passed through the LPF 55 generating a signal having frequency $f_Q - f_c = f_o$. This signal is input into a frequency discriminator 57 centered at 100 kHz (for illustrative purposes) with the output being a signal indicating the frequency difference between $f_o$ and the center frequency of 100 kHz. This difference is applied to low pass filter 61, a filter having a cutoff of 250 kHz, before being fed into the ADC 63 and finally into the digital oscillator 51. The difference frequency will eventually lock to 100 kHz, the center frequency of the frequency discriminator 57. Low frequency doppler shifts will be tracked out, but high frequency modulating signals will not.

FREQUENCY MODULATOR

Figure 9:
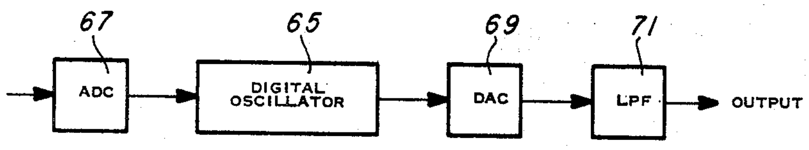
FIG. 9 shows the Frequency Modulator.

The FM modulator configuration, shown in FIG. 9, also makes use of a digital oscillator 65 as a replacement for a VCO. The modulating signal is input into the ADC 67, its output thus supplying an indication of the modulation around the carrier frequency (the modulation index of the modulator can be varied by adjusting a scale value on the input of the ADC 67). This digitized FM modulated output of the digital oscillator 65 is then passed through a DAC 69 and LPF 71, thus generating the analog equivalent output. A sideline to this method of FM modulation is that one can easily select and vary the modulating carrier frequency.

DETAILED DESCRIPTION

Mechanical Description

The construction consists of dual-in-line integrated circuits mounted in sockets which are wire-wrapped on plug-in cards. The 4 inch by 4 inch cards accommodate 10 to 20 sockets (integrated circuits). The cards, in turn, are mounted on a rack so that intercard wiring can be achieved. Analog circuits are mounted on plug-in cards so that the entire system can be contained in a card rack. The card rack and required power supplies are mounted in a 19-inch rack-mountable cabinet.

OPERATIONAL DESCRIPTION

The digital oscillator (DO) is sectioned into 10 functional blocks, each mounted on one printed circuit board (PCB). Nine of these boards are mounted in a card file; the tenth, the power regulator board is mounted at the rear of the chassis along with the remainder of the power supply components.

DIGITAL PORTION

FIGS. 10*a* and *b* show the seven digital blocks of the digital oscillator. A description of each of these blocks and their functions follow.

1.

Recursive Adder Board 73 (Board E). The recursive adder board 73 (FIG. 10*a*) forms the heart of the DO function. This board generates a 9-bit binary digitized sinusoidal whose frequency is specified by a 20-bit binary input board. This is accomplished as follows:

The 20-bit word A is applied to the 20 LSB of one input of a 22-bit full adder 75. The other 22-bit input is tied to the outputs of a 22-bit parallel register. The 22 sum lines from the adder are tied to the inputs of E register 77. The E-register is clocked at a rate of $2^{22}$ Hz, and at each clock pulse, the sum of the input word A and the present contents of the register are stored in the register.

The 10 MSB (most significant bits) of the register 77 are used to control the sinusoidal generator process. The 8 LSB's (least significant bits) of these 10 are fed through controlled inverters 79 to the 512-bit ROM 81 address inputs. The second MSB (R21) controls the inversion, with inversion occurring when this line is a logic 0. The MSB (signal) R22 and the eight outputs of the ROM 81 are then routed to the DAC Board, Board F, 83 (FIG. 10*b*).

2.

DAC Board F, 83. The DAC board 83 accepts the nine ROM 81 bits and the sign bit from the Adder Board E, 73, and connects the words to an analog sinusoidal output. The SIGN-bit line controls the MSB input of the DAC 85 and a two's complement operation 87. The two's complement of the incoming 8-bit word is generated by complementing all the bits and adding a binary 1. These 8 bits are buffered by a parallel register 89 clocked at the system rate of $2^{22}$ Hz.

The analog output of DAC 85 is buffered by a wideband operational amplifier 91 and made available to a front panel test point. This signal is also passed through a two pole, 2 MHz LPF 93 to partially remove $2^{22}$ Hz switching rate noise.

3.

Buffer Board I, 95. The buffer board 95 provides further low pass filtering for the filtered output from the DAC board. This doubly filtered output is then routed to the OSC OUT connector and the Mixer Board G, 97 (FIG. 11).

4.

Modulation Board D, 99 (FIG. 10*b*). The 20-bit binary input word "A" to the recursive adder board 73 is provided from the Modulation Board D, 99, which provides the sum of the 20-bit front panel word and optionally the 12-bit ADC word.

The 20-bit front panel derived word is generated by providing the proper number of clock pulses to a 20 bit ripple through adder 103 whenever the front panel settings are changed. This clock is supplied by the BCD to Binary Converter Board B, 105.

The 12-bit ADC derived word is supplied from the ADC Board C, 101, and made available to the modulation adder 103 through a 12-bit input buffer register 109. These words are formed in two's complement binary and enable subtraction as well as addition. When modulation by the ADC 101 is not desired (Synthesizer and Translation modes) the register 109 is set to zero by a clear enable line from the mode control switch.

A start conversion clock of 32 kHz is generated from the master clock and provided to the ADC module 101, and this module in turn supplies the End of Conversion pulse to clock the 120-bit modulator register.

5.

ADC Converter Board C, 101. This board contains an input buffer amplifier/level converter 111 and the 12-bit ADC module 113. The input to the buffer amplifier is controlled by the mode switch and is either the FM IN terminal or the internal FM discriminator.

6.

BCD/Binary Converter Board B, 105. The 24 BCD input lines from the front panel witches 113 (FIG. 10*a*) are converted to a binary word by enabling a $2^{21}$ Hz clock (FIG. 10*b*) to both a binary counter 119 and a BCD counter 115 until a 24 bit comparator 117 determines that the BCD input and the BCD counter 115 are the same. The count clock is then disabled and the binary counter 119 (located on board D) holds that count in binary form until the 24 bit comparator 117 signals that a front panel changes has been made.

7.

Clock Board A, 121. This board includes a $2^{22}$ Hz crystal oscillator 123 and digital clock drivers 125 and 127 for Clock and Clock.

ANALOG PORTION

FIG. 11 illustrates the two analog boards.

1.

Mixer Board G, 97. This board includes a balanced mixer 129 and two IF (low pass filters) 131 and 133.

One input to the mixer is the digital oscillator, the other the HF IN front panel terminal. The outputs of the 100 kHz LPF are available on the front panel and to the Discriminator Board H, 135.

2.

Discriminator Board H, 135. This board 135 includes a zero crossing detector 137 and 10 μsec one-shot 139 (for frequency discrimination) followed by two parallel filters 141 and 143. One of these is a 100 Hz LPF used in the system tracking loop; the other is an AC coupled 2 kHz LPF providing detected FM to the DISC OUT terminal.

What is claimed is:

1. A digital processor for selectively synthesizing sinusoidal waveforms and frequency modulations comprising:

a. means for selectively producing a binary number indicative of a digitized center frequency of a band of frequencies;

b. means for producing a number indicative of digitized analog modulating signals coupled to the means for producing a binary number of a center frequency for varying the binary number in accordance therewith to produce an address for a storage means; and c. storage means having numbers indicative of amplitude values for sinusoidal waveforms operable responsively to the address to produce contiguous numbers indicative of the amplitude values for producing a sinusoidal pattern of the modulated waveform.

2. A digital processor for selectively synthesizing sinusoidal waveforms and frequency modulations comprising:

a. means for obtaining numbers indicative of a desired center frequency of a band of frequencies;

b. means for digitizing analog modulating signals and obtaining numbers indicative thereof;

c. adder means coupled to the means for selecting a desired center frequency in digital form and means for digitizing analog modulating signals for adding the numbers of these means for frequency modulation, the addition of these numbers forming an address for a storage means; and d. a storage means containing numbers indicative of amplitude values for sinusoidal waveforms coupled to the adder means and responsive to the address number of the adder means for producing contiguous amplitude value numbers for a sinusoidal waveform.

3. A digital processor according to claim 2 wherein said means for obtaining numbers indicative of a desired center frequency from a band of frequencies includes a clock generating clock pulses at a fixed rate, a decimal-to-binary converter means coupled to said clock for determining the number of clock pulses in each phase step responsively to the selected center frequency, and a decimal dial coupled to the decimal-to-binary counter for selecting the desired center frequency for the decimal-to-binary converter.

4. A digital processor according to claim 2 wherein said adder means includes a first adder coupled to receive the numbers of the means for selecting a desired center frequency of a band of frequencies and the numbers of the means for digitizing analog modulating signals for adding the numbers indicative of the digitized analog modulating signals to the least significant numbers of the digitized center frequency number for frequency modulation and a second adder coupled to the output of the first adder and storage means for numerical integration to maintain a complete history of the inputs to the first adder.

5. A digital processor according to claim 4 wherein the storage means includes a buffer memory coupled to the output of the second adder, said buffer memory having a feedback means coupled to the second adder whereby said second adder combines the feedback with the first adder to accumulate numbers indicative of phase increments.

* * * * *

UNITED STATES PATENT OFFICE
CERTIFICATE OF CORRECTION

Patent No. 3,824,498 Dated July 16, 1974

Inventor(s) Alan L. McBride

It is certified that error appears in the above-identified patent and that said Letters Patent are hereby corrected as shown below:

[73] Assignee: Delete "Dallas" and substitute --Texas--.

In the drawings, sheet 7, FIG. 11, above filter 141, "100KHz" should read --100Hz--. Column 2, line 55, that portion of the equation reading "$y(n\Delta T)$" should read --$\hat{y}(n\Delta T)$--; line 58, "y", first occurrence, should read --$\hat{y}$--. Column 3, line 3, "$y(n\Delta T)$" should read --$\hat{y}(n\Delta T)$--; lines 38, 49 and 53, that portion of the equations reading "$[Mjf_o/s^f]$" should read --$[Mjf_o/f_s]$--; line 45, that portion of the equation reading "$[Mjf_o s^f]$" should read --$[Mjf_o/f_s]$--. Column 4, line 13, the right side of the equation should read --$\sin\{(2\pi/M)[Mnf_o/f_s] + E\}$--; line 24, "2464" should read --$\geq 64$--; line 35, the equation should read $|\sin 2\pi f_o/f_s - \sin 2\pi/M\,[Mnf_o/f_s]| \leq \sin \epsilon_{max} \cong \epsilon_{max}$. Column 6, line 57, "250kHz" should read --100Hz--. Column 7, line 46, "E register" should read --E-register--. Column 8, line 60, "clock", second occurrence, should read --$\overline{clock}$--.

Signed and sealed this 10th day of December 1974.

(SEAL)
Attest:

McCOY M. GIBSON JR.
Attesting Officer

C. MARSHALL DANN
Commissioner of Patents